US008543085B2

(12) United States Patent
Jung (10) Patent No.: US 8,543,085 B2
(45) Date of Patent: Sep. 24, 2013

(54) QUALITY OF EXPERIENCE ESTIMATION (75) Inventor: Sukho Jung, Seongnam-si (KR)

(73) Assignee: Empire Technology Development LLC, Wilmington, DE (US)

( * ) Notice: Subject to any disclaimer, the term of this patent is extended or adjusted under 35 U.S.C. 154(b) by 88 days.

(21) Appl. No.: 13/142,054

(22) PCT Filed: Mar. 30, 2011

(86) PCT No.: PCT/US2011/030572
§ 371 (c)(1),
(2), (4) Date: Jun. 24, 2011

(87) PCT Pub. No.: WO2012/134465
PCT Pub. Date: Oct. 4, 2012

(65) Prior Publication Data
US 2012/0252402 A1 Oct. 4, 2012

(51) Int. Cl.
*H04M 11/00* (2006.01)
(52) U.S. Cl.
USPC ........... 455/405; 455/566; 455/436; 455/574; 455/421; 455/41.2; 455/572
(58) Field of Classification Search
USPC ................ 455/405, 566, 436, 574, 421, 41.2, 455/572
See application file for complete search history.

(56) References Cited

U.S. PATENT DOCUMENTS

| | | | | |
|---|---|---|---|---|
| 6,801,794 | B2 * | 10/2004 | Bauer | 455/574 |
| 7,606,543 | B1 * | 10/2009 | Seppanen | 455/226.2 |
| 2004/0233153 | A1 * | 11/2004 | Robinson | 345/102 |
| 2009/0131081 | A1 * | 5/2009 | Abdel-Kader et al. | 455/456.6 |
| 2010/0069021 | A1 * | 3/2010 | Echensperger | 455/99 |
| 2010/0197363 | A1 | 8/2010 | Sorensen et al. | |
| 2012/0208601 | A1 * | 8/2012 | Lockwood | 455/566 |

OTHER PUBLICATIONS

Ravindranath, L. et al., Extra Sensory Perception for Wireless Networks, Proceedings of the Ninth ACM SIGCOMM Workshop on Hot Topics in Networks, Hotnets '10, Oct. 20-21, 2010, pp. 1-6, Monterey, CA, USA.

* cited by examiner

*Primary Examiner* — Barry Taylor
(74) *Attorney, Agent, or Firm* — Maschoff Brennan

(57) ABSTRACT

Technologies are generally described for estimating a quality of experience (QoE) based on movements of a mobile device in a telecommunication system. In some examples, a mobile device may include a detection unit configured to detect a first movement of the mobile device and a second movement of the mobile device, a timer configured to measure a time interval between the first movement and the second movement detected by the detection unit, and a decision unit configured to determine whether the first and second movements are related to telecommunication quality of the mobile device based on the time interval measured by the timer.

17 Claims, 5 Drawing Sheets

QUALITY OF EXPERIENCE ESTIMATION

BACKGROUND

Users of mobile devices often experience voice discontinuity, which leads to users' dissatisfaction about telecommunication quality provided by a mobile service provider. In this regard, in order to improve users' satisfaction, it is necessary for the service provider to estimate a quality of experience (QoE) with a reliable measure and take follow-up actions based on the estimated quality of experience (QoE).

SUMMARY

In an example, a mobile device may include a detection unit configured to detect a first movement of the mobile device and a second movement of the mobile device, a timer configured to measure a time interval between the first movement and the second movement detected by the detection unit, and a decision unit configured to determine whether the first and second movements are related to telecommunication quality of the mobile device based on the time interval measured by the timer.

In an example, a method for measuring telecommunication quality of a mobile device may include detecting two consecutive movements of the mobile device, and determining whether the two consecutive movements are related to the telecommunication quality of the mobile device, based on a time interval between the two consecutive movements.

In an example, a computer-readable storage medium whose contents, when executed by a processor, cause the processor to detect two consecutive movements of a mobile device, and determine whether the two consecutive movements are related to telecommunication quality, based on a time interval between the two consecutive movements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to measuring a quality of experience of a telecommunication system.

Briefly stated, technologies are generally described for measuring telecommunication quality of a mobile device. In some examples, two consecutive movements of the mobile device are detected, and based on a time interval between the two consecutive movements, it is determined whether the two consecutive movements are related to the telecommunication quality of the mobile device.

Figure 1A:
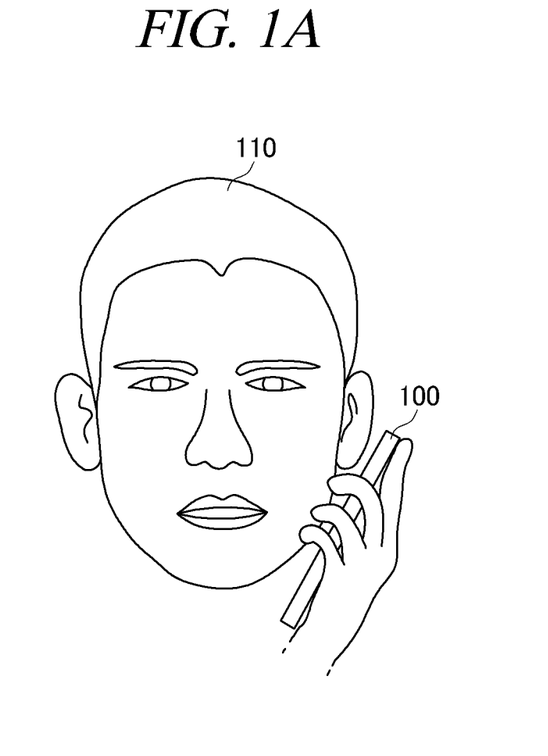
FIGS. 1A and 1B show illustrative examples of positions of a mobile device, the changes of which to be employed for measuring telecommunication quality of the mobile device.
Figure 1B:
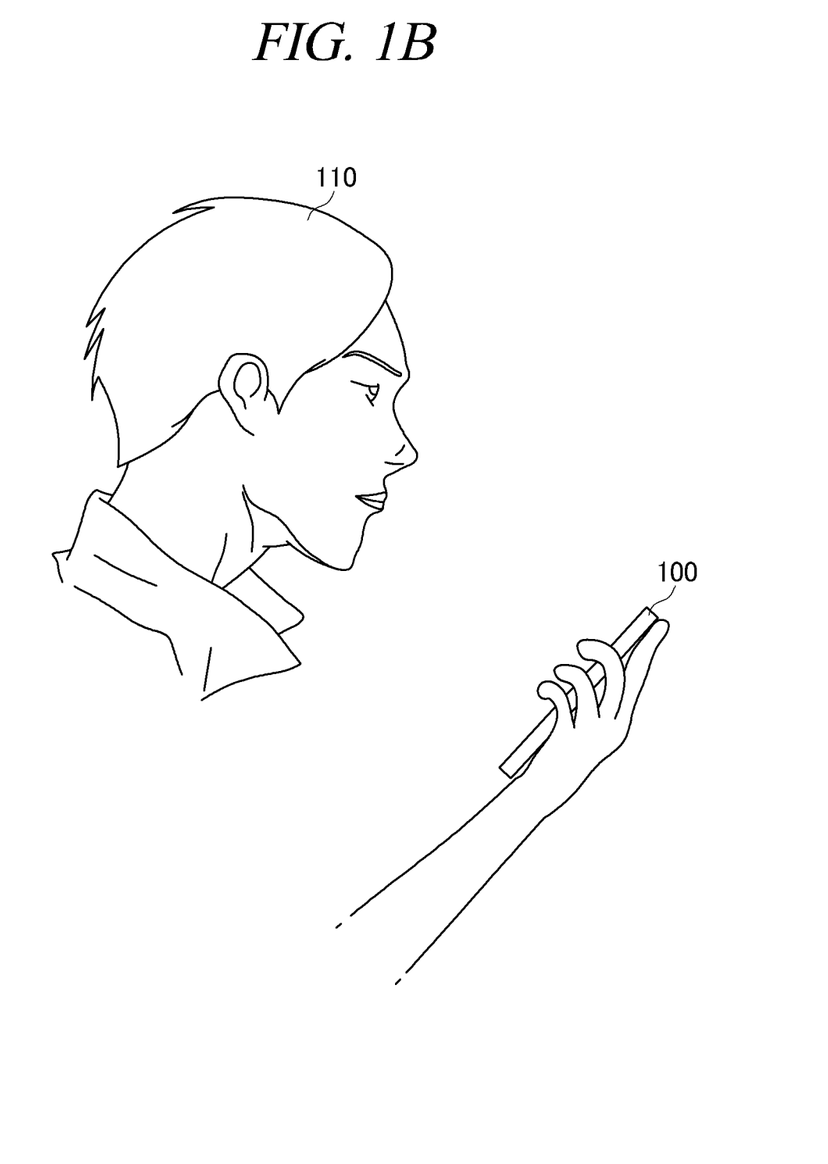

FIGS. 1A and 1B show illustrative examples of positions of a mobile device 100, the changes of which to be employed for measuring telecommunication quality of mobile device 100. When a user 110 of mobile device 100 has a phone call, mobile device 100 may be positioned to be in close proximity to an ear of user 110, as illustrated in FIG. 1A. During the phone call, when user 110 cannot hear well of the other party of the phone call (i.e., when the telecommunication quality is poor), user 110 may want to check whether the phone call is disconnected or mobile device 100 is out of service area. In such a case, user 110 may move mobile device 100 away from his/her ear and then move mobile device 100 towards his/her chest to see a display screen of mobile device 100, as illustrated in FIG. 1B. User 110 may intend to check the telecommunication quality by checking connectivity of the phone call or looking at an antenna indicator displayed on the display screen of mobile device 100. After checking the telecommunication quality, user 110 may move mobile device 100 back to the original position as illustrated in FIG. 1A, as long as the call is not losing. Such movements of mobile device 100, that is, a first movement of mobile device 100 from a position in close proximity to the ear of user 110 to a position in close proximity to the chest of user 110 (i.e., from the position in FIG. 1A to the position in FIG. 1B) and a second movement of mobile device 100 from the position in close proximity to the chest to the position in close proximity to the ear (i.e., from the position in FIG. 1B to the position in FIG. 1A), may become a measure for estimating a quality of experience (QoE) of mobile device 100.

In some embodiments, it may be determined whether the first and second movements of mobile device 100 are related to the telecommunication quality of mobile device 100, based on a time interval between the first and second movements. In some embodiments, it may be determined that the first and second movements are related to the telecommunication quality, if the time interval between the first and second movements is within a predetermined range.

By way of example, but not limitation, in case where the time interval between the first and second movements is shorter than a first time threshold, it may be assumed that the user moves the mobile device with an intention to change posture or to shift the mobile device from one ear to another ear, rather than with an intention to check the telecommunication quality. Also, by way of example, but not limitation, in case where the time interval between the first and second movements is longer than a second time threshold which is longer than the first time threshold, it may be assumed that the user moves the mobile device with an intention to perform other functions not related to the connectivity (e.g., to write down memo or to press certain buttons), rather than with an intention to check the telecommunication quality. In some embodiments, when the mobile device is not located in close proximity to the ear of the user and any button not related to the connectivity (e.g., buttons except for "send," "call," or "end" button) is pressed, such cases may be excluded for estimating the quality of experience (QoE).

Figure 2:
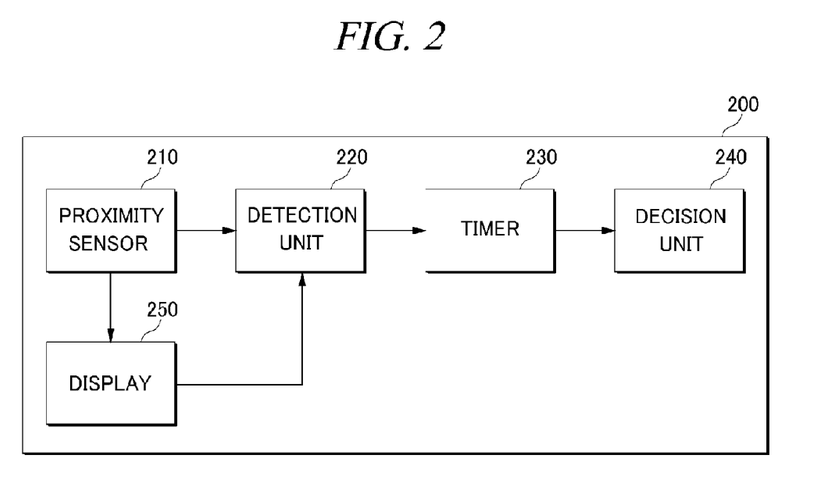
FIG. 2 shows a schematic block diagram of an illustrative example of a mobile device.

FIG. 2 shows a schematic block diagram of illustrative example of a mobile device. The example illustrated in FIG. 2 may use a proximity sensor to detect movements of the mobile device.

Referring to FIG. 2, a mobile device 200 may include a proximity sensor 210. Proximity sensor 210 may detect a distance of an object from proximity sensor 210, and output a first signal if the detected distance is within a threshold distance and a second signal if the detected distance is longer than the threshold distance. By way of example, but not limitation, the first signal may represent binary value '1', and the second signal may represent binary value '0'.

In some embodiments, the signal output from proximity sensor 210 may be changed from the first signal to the second signal when mobile device 200 moves away from an ear of a user of mobile device 200 and towards a chest of the user. Similarly, the signal output from proximity sensor 210 may be changed from the second signal to the first signal when mobile device 200 moves from the chest to the ear. By way of example, but not limitation, proximity sensor 210 may include at least one selected from a group consisting of a capacitive sensor, an inductive sensor, and a magnetic sensor.

Mobile device 200 may further include a detection unit 220. Detection unit 220 may receive the signal output from proximity sensor 210, and detect movements of mobile device 200 based on the output of proximity sensor 210. By way of example, but not limitation, detection unit 220 may detect a first movement of mobile device 200 (e.g., the movement from the ear to the chest) when the output of proximity sensor 210 is changed from the first signal to the second signal. Similarly, detection unit 210 may detect a second movement of mobile device 200 (e.g., the movement from the chest to the ear) when the output of proximity sensor 210 is changed from the second signal to the first signal.

Mobile device 200 may further include a timer 230. Timer 230 may measure a time interval between the first movement and the second movement detected by detection unit 220. By way of example, but not limitation, timer 230 may start when detection unit 220 detects the first movement of mobile device 200 and stop when detection unit 220 detects the second movement of mobile device 200. Thereafter, timer 230 may calculate the time interval between the first movement and the second movement.

Mobile device 200 may further include a decision unit 240. Decision unit 240 may determine whether the first and second movements are related to telecommunication quality of mobile device 200, based on the time interval measured by timer 230. In some embodiments, decision unit 240 may determine that the first and second movements are related to the telecommunication quality, if the time interval is within a predetermined time range. By way of example, but not limitation, the predetermined time range may be set so as to exclude such a case where the first and second movements are not related to a user action for checking the telecommunication quality. By way of example, but not limitation, if the time interval measured by timer 230 is shorter than a first time threshold, e.g., 0.4 seconds, the first and second movements may be considered as being related to a user action for changing posture or shifting mobile device 200 from one ear to another ear, rather than being related to the user action for checking the connectivity. By way of example, but not limitation, if the time interval measured by timer 230 is longer than a second time threshold which is longer than the first time threshold, the first and second movements may be considered as being related to a user action for performing other functions not related to the connectivity (e.g., writing down memo or pressing certain buttons), rather than being related to the user action for checking the connectivity.

In some embodiments, the predetermined range may be adjusted based on usage pattern of mobile device 200. By way of example, but not limitation, the usage pattern of mobile device 200 may be statistical information collected by mobile device 200 or a mobile service provider which provides a mobile telecommunication service to mobile device 200.

By way of example, but not limitation, mobile device 200 may further include a transceiver (not shown). The transceiver may send the output of decision unit 240 to the mobile service provider. That is, the transceiver may report whether there is a user action associated with the telecommunication quality of mobile device 200. By way of example, but not limitation, the transceiver may also send the statistical information on the usage pattern of mobile device 200 to the mobile service provider.

In some embodiments, mobile device 200 may further include a display 250 for displaying a user interface of mobile device 200. By way of example, but not limitation, display 250 may be in off-status when the distance detected by proximity sensor 210 is within the threshold distance, i.e., an object is positioned within the threshold distance from proximity sensor 210, so as to reduce power consumption. By way of example, but not limitation, display 250 may be in on-status when the distance detected by proximity sensor 210 is longer than the threshold distance, i.e., the object is distanced away from proximity sensor 210 by a distance longer than the threshold distance. In some embodiments, display 250 may be turned off when the output from proximity sensor 210 is changed from the first signal to the second signal, i.e., when mobile device 200 moves away from the ear of the user and towards the chest of the user. Similarly, display 250 may be turned on when the output from proximity sensor 210 is changed from the second signal to the first signal, i.e., when mobile device 200 moves from the chest to the ear. In such cases, detection unit 220 may detect the first movement and the second movement based on the on/off status of display 250 instead of the signal output from proximity sensor 210. By way of example, but not limitation, detection unit 220 may detect the first movement when the status of display 250 is changed from off-status to on-status. Similarly, detection unit 220 may detect the second movement when the status of display 250 is changed from on-status to off-status.

Figure 3:
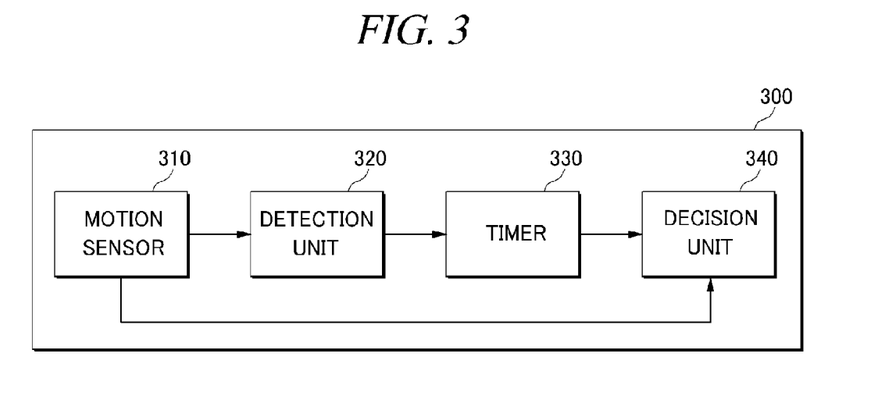
FIG. 3 shows a schematic block diagram of another illustrative example of a mobile device.

FIG. 3 shows a schematic block diagram of another illustrative example of a mobile device. The example illustrated in FIG. 3 may use a motion sensor to detect movements of the mobile device.

Referring to FIG. 3, a mobile device 300 may include a motion sensor 310. Motion sensor 310 may sense a movement of mobile device 300 and output a signal corresponding to the movement of mobile device 300. The signal output from motion sensor 310 may be a vector value. By way of example, but not limitation, the vector value may be selected from a group consisting of velocity, acceleration, angular velocity, angular acceleration, and any combination thereof.

In some embodiments, motion sensor 310 may output a first signal corresponding to a first movement of mobile device 300 and a second signal corresponding to a second movement of mobile device 300. In some embodiments, if the first movement corresponds to a case where mobile device 300 moves away from an ear of a user of mobile device 300 and towards a chest of the user and the second movement corresponds to a case where mobile device 300 moves from the chest to the ear, the sum of the first signal and the second signal may be approximately zero.

Mobile device 300 may further include a detection unit 320. Detection unit 320 may receive the signal output from motion sensor 310, and detect movements of mobile device 300 based on the output of motion sensor 310.

Mobile device 300 may further include a timer 330. Timer 330 may measure a time interval between the first movement and the second movement detected by detection unit 320. By way of example, but not limitation, timer 330 may start when detection unit 320 detects the first movement of mobile device 300 and stop when detection unit 320 detects the second movement of mobile device 300. Thereafter, timer 330 may calculate the time interval between the first and second movements.

Mobile device 300 may further include a decision unit 340. Decision unit 340 may determine whether the first and second movements are related to telecommunication quality of mobile device 300, based on the signal output from motion sensor 310 and the time interval measured by timer 330. In some embodiments, decision unit 340 may determine that the first and second movements are related to the telecommunication quality, if the sum of the first signal and the second signal is approximately zero, and if the time interval is within a predetermined range. In some embodiments, the predetermined range may be set so as to exclude such a case where the first and second movements are not related to a user action for checking the telecommunication quality. By way of example, but not limitation, if the time interval measured by timer 330 is shorter than a first time threshold, the first and second movements may be considered as being related to a user action for changing posture or shifting mobile device 300 from one ear to another ear, rather than being related to the user action for checking the connectivity. By way of example, but not limitation, if the time interval measured by timer 330 is longer than a second time threshold which is longer than the first time threshold, the first and second movements may be considered as being related to a user action for performing other functions not related to the connectivity (e.g., writing down memo or pressing certain buttons), rather than being related to the user action for checking the connectivity.

In some embodiments, the predetermined range may be adjusted based on usage pattern of mobile device 300. By way of example, but not limitation, the usage pattern of mobile device 300 may be statistical information collected by mobile device 300 or a mobile service provider providing a mobile telecommunication service to mobile device 300.

By way of example, but not limitation, mobile device 300 may further include a transceiver (not shown). The transceiver may send the output of decision unit 340 to the mobile service provider. That is, the transceiver may report whether there is a user action associated with the telecommunication quality of mobile device 300. By way of example, but not limitation, the transceiver may also send the statistical information on the usage pattern of mobile device 300 to the mobile service provider.

Figure 4:
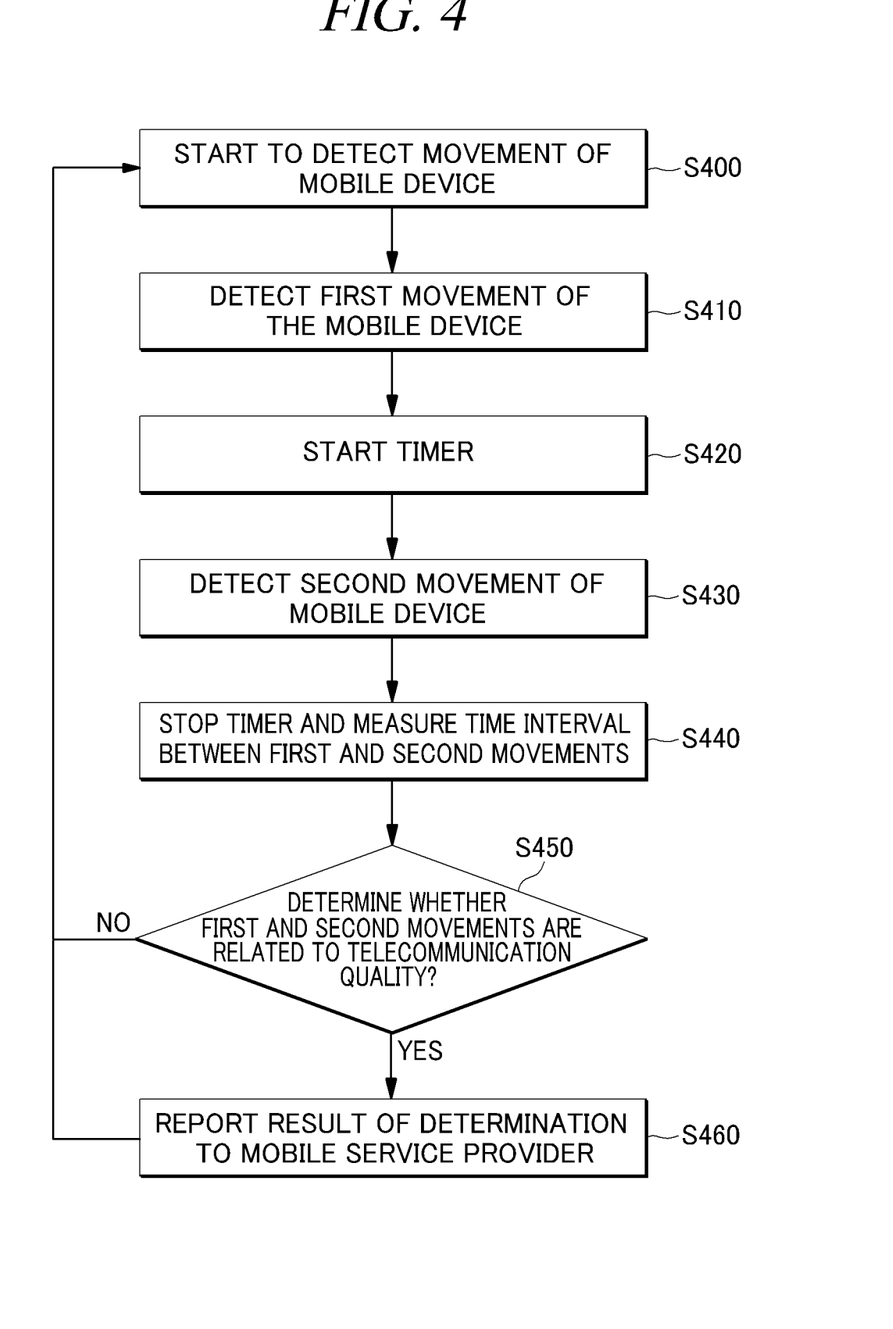
FIG. 4 shows an example flow diagram of a method for measuring telecommunication quality of a mobile device.

FIG. 4 shows an example flow diagram of a method for measuring telecommunication quality of a mobile device. The method in FIG. 4 could be implemented using, for example, the mobile device discussed above. An example method may include one or more operations, actions, or functions as illustrated by one or more of blocks S400, S410, S420, S430, S440, S450, and/or S460. Although illustrated as discrete blocks, various blocks may be divided into additional blocks, combined into fewer blocks, or eliminated, depending on the desired implementation.

At block S400, a mobile device may start to detect a movement of the mobile device. By way of example, but not limitation, a detection unit may detect the movement of the mobile device.

In some embodiments, the detection unit may detect the movement of the mobile device based on the output of a proximity sensor included in the mobile device. By way of example, but not limitation, the detection unit may detect the movement of the mobile device when the output of the proximity sensor changed from a first signal corresponding to the status where an object is positioned within a predetermined distance from the proximity sensor to a second signal corresponding to the status where the object is distanced away from the proximity sensor by a distance longer than the predetermined distance, or changed from the second signal to the first signal.

In alternative embodiments, the detection unit may detect the movement of the mobile device based on on/off status of a display included in the mobile device. By way of example, but not limitation, the detection unit may detect the movement of the mobile device when the status of the display is changed from off-status to on-status or changed from on-status to off-status.

In yet alternative embodiments, the detection unit may detect the movement of the mobile device based on the output of a motion sensor included in the mobile device.

Referring to FIG. 4 again, when the mobile device detect a first movement of the mobile device (block S410), a timer included in the mobile device may start (block S420). Then, when the mobile device detect a second movement of the mobile device, which follows the first movement consecutively (block S430), the timer may stop and measure the time interval between the first movement and the second movement (block S440).

At block S450, the mobile device may determine whether the first and second movements are related to the telecommunication quality of the mobile device. By way of example, but not limitation, a decision unit included in the mobile device may determine whether the first and second movements are related to the telecommunication quality of the mobile device.

In some embodiments, the decision unit may determine whether the first and second movements are related to the telecommunication quality based on the output of the proximity sensor and the time interval between the first and second movements. By way of example, but not limitation, if the first movement is detected when the output of the proximity sensor is changed from the first signal corresponding to the status where an object is positioned within a predetermined distance from the proximity sensor to the second signal corresponding to the status where the object is distanced away from the proximity sensor by a distance longer than the predetermined distance, and then the second movement is detected when the output of the proximity sensor is changed from the second signal to the first signal, and if the time interval between the first movement and the second movement is within a predetermined range, the decision unit may determine that the first and second movements are related to the telecommunication quality.

In alternative embodiments, the decision unit may determine whether the first and second movements are related to the telecommunication quality based on the on/off status of the display and the time interval between the first and second movements. By way of example, but not limitation, the decision unit may determine that the first and second movements are related to the telecommunication quality, if the first movement is detected when the status of the display is changed from off-status to on-status, and then the second movement is detected when the status of the display is changed from on-status to off-status, and if the time interval between the changes of the on/off status of the display is within a predetermined range.

In yet alternative embodiments, the decision unit may determine whether the first and second movements are related to the telecommunication quality based on the output of the motion sensor and the time interval between the first and second movements. By way of example, but not limitation, the decision unit may determine that the first and second movements are related to the telecommunication quality, if the sum of a first signal output from the motion sensor which corresponds to the first movement and a second signal output from the motion sensor which corresponds to the second movement is approximately zero, and if the time interval between first and second movements is within a predetermined range. By way of example, but not limitation, the first and second signals output from the motion sensor may be selected from a group consisting of velocity of the mobile device, acceleration of the mobile device, angular velocity of the mobile device, angular acceleration of the mobile device, and any combination thereof.

In some embodiments, if the mobile device determines that the first and second movements are not related to the telecommunication quality at block S450, the process may continue to block S400 again. In some embodiments, if the mobile device determines that the first and second movements are related to the telecommunication quality, the mobile device may report the result of the determination, that is, send a notice indicating that there is a user action associated with the telecommunication quality of the mobile device, to a mobile service provider which provides a mobile telecommunication service to the mobile device (block S460), and then the process may continue to block S400 again. In some embodiments, the mobile device may further provide information on usage pattern of the mobile device to the mobile service provider. Although it is illustrated in FIG. 4 that the mobile device reports the result of determination at every time the user action associated with the telecommunication quality of the mobile device occurs, one skilled in the art will appreciate that the mobile device may collect the result of determination for a certain period and then report the collected result at once.

In some embodiments, the mobile service provider may consider the notice from the mobile device as a measure of a quality of experience (QoE) of the mobile device, and take follow-up actions based on the received notice. By way of example, but not limitation, the mobile service provider may take an immediate action for the mobile device such as, for example, letting another base station provide telecommunication coverage to the mobile device. By way of example, but not limitation, the mobile service provider may collect the notice from the mobile device and estimate long-term quality of experience (QoE), and take any action for improve the user's satisfaction based on the estimated long-term quality of experience (QoE).

In some embodiments, the mobile service provider may provide feedback to the mobile device based on the received information on the usage pattern of the mobile device, so that the mobile device may adjust the time range to be compared with the time interval between the first and second movements when determining whether the movements of the mobile device are related to the telecommunication quality.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A mobile device comprising:
   a detection unit configured to detect a first movement of the mobile device and a second movement of the mobile device;
   a timer configured to measure a time interval between the first movement and the second movement detected by the detection unit; and
   a decision unit configured to determine that telecommunication quality of the mobile device is being checked based on the first movement, the second movement, and the time interval between the first movement and the second movement being within a predetermined range, the predetermined range being adjusted based on a usage pattern of the mobile device.

2. The mobile device of claim 1, further comprising:
   a proximity sensor configured to detect a distance of an object from the proximity sensor,
   wherein the detection unit is further configured to detect the first and second movements based on output of the proximity sensor.

3. The mobile device of claim 2, wherein the detection unit is further configured to detect the first movement when the output of the proximity sensor is changed from a first signal to a second signal and detect the second movement when the output of the proximity sensor is changed from the second signal to the first signal, and
   wherein the first signal is output from the proximity sensor when the object is positioned within a predetermined distance from the proximity sensor, and the second signal is output from the proximity sensor when the object is distanced away from the proximity sensor by a distance longer than the predetermined distance.

4. The mobile device of claim 1, further comprising:
   a motion sensor configured to sense the first and second movements of the mobile device and output a first signal and a second signal corresponding to the first movement and the second movement of the mobile device, respectively,
   wherein the detection unit is further configured to detect the first movement and the second movement based on the first signal and the second signal.

5. The mobile device of claim 4, wherein the first and second signals are vectors and are selected from a group consisting of velocity, acceleration, angular velocity and angular acceleration.

6. The mobile device of claim 1, further comprising:
   a display configured to display a user interface of the mobile device,
   wherein the detection unit is further configured to detect the first movement and the second movement based on on/off status of the display.

7. The mobile device of claim 6, wherein the detection unit is further configured to detect the first movement when the status of the display is changed from off-status to on-status and detect the second movement when the status of the display is changed from on-status to off-status.

8. A method for measuring telecommunication quality of a mobile device, the method comprising:
   detecting a first movement of the mobile device;
   detecting a second movement of the mobile device, the detecting the first movement of the mobile device and the detecting the second movement of the mobile device being based on an on/off status of a display of the mobile device;
   measuring a time interval between the first movement and the second movement of the mobile device; and
   determining that telecommunication quality of the mobile device is being checked based on the first movement, the second movement, and the time interval between the first movement and the second movement being within a predetermined range.

9. The method of claim 8, wherein the predetermined range is adjusted based on usage pattern of the mobile device.

10. The method of claim 8, further comprising:
    receiving output of a proximity sensor configured to detect a distance of an object from the proximity sensor,
    wherein the detecting the first movement of the mobile device and the detecting the second movement of the mobile device are based on the output of the proximity sensor.

11. The method of claim 10, wherein the determining is further based on the output of the proximity sensor being changed from a first signal to a second signal and then the output of the proximity sensor being changed from the second signal to the first signal, and a second time interval between the changes of the output of the proximity sensor being within a second predetermined range, and
    wherein the first signal is output from the proximity sensor when the object is positioned within a predetermined distance from the proximity sensor, and the second signal is output from the proximity sensor when the object is distanced away from the proximity sensor by a distance longer than the predetermined distance.

12. The method of claim 8, further comprising:
    receiving output of a motion sensor configured to sense a movement of the mobile device, and
    wherein the detecting the first movement of the mobile device and the detecting the second movement of the mobile device are based on the output of the motion sensor.

13. The method of claim 12, wherein the receiving further comprises receiving a first signal corresponding to the first movement and a second signal corresponding to the second movement, and the first and second signals are vectors and are selected from a group consisting of velocity, acceleration, angular velocity and angular acceleration.

14. The method of claim 13, wherein the determining is further based on the sum of the first signal and the second signal being approximately zero.

15. The method of claim 8, wherein the determining is further based on the status of the display being changed from off-status to on-status and then the status of the display being changed from on-status to off-status, and a second time interval between the changes of the on/off status of the display being within a second predetermined range.

16. The method of claim 8, further comprising: reporting a result of the determining to a mobile service provider.

17. A non-transitory computer-readable storage medium whose contents, when executed by a processor, cause the processor to:
   detect a first movement of a mobile device;
   detect a second movement of the mobile device, the detection of the first movement of the mobile device and the detection of the second movement of the mobile device being based on an on/off status of a display of the mobile device;
   measure a time interval between the first movement and the second movement of the mobile device; and
   determine that telecommunication quality of the mobile device is being checked, based on the first movement, the second movement, and the time interval between the first movement and the second movement being within a predetermined range.

* * * * *

UNITED STATES PATENT AND TRADEMARK OFFICE
CERTIFICATE OF CORRECTION

| | | |
|---|---|---|
| PATENT NO. | : 8,543,085 B2 | |
| APPLICATION NO. | : 13/142054 | |
| DATED | : September 24, 2013 | |
| INVENTOR(S) | : Jung | |

It is certified that error appears in the above-identified patent and that said Letters Patent is hereby corrected as shown below:

In the Specification

In Column 9, Lines 60-61, delete "components" and insert -- components. --, therefor.

Signed and Sealed this
Twentieth Day of May, 2014

Michelle K. Lee
*Deputy Director of the United States Patent and Trademark Office*